(12) United States Patent
Wang et al.

(10) Patent No.: US 10,907,752 B2
(45) Date of Patent: Feb. 2, 2021

(54) PIPE BODY, PIPE AND METHOD OF MAKING PIPE

(71) Applicant: Zhejiang Sanhua Intelligent Controls Co., Ltd., Zhejiang (CN)

(72) Inventors: Yiqi Wang, Zhejiang (CN); Xinyu Zhuang, Zhejiang (CN); Shengli Zhang, Zhejiang (CN); Yong Pan, Zhejiang (CN); Zhijun Zhang, Zhejiang (CN); Feng Chen, Zhejiang (CN)

(73) Assignee: Zhejiang Sanhua Intelligent Controls Co., Ltd., Zhejiang (CN)

( * ) Notice: Subject to any disclaimer, the term of this patent is extended or adjusted under 35 U.S.C. 154(b) by 60 days.

(21) Appl. No.: 16/071,768

(22) PCT Filed: Jan. 20, 2017

(86) PCT No.: PCT/CN2017/071916
§ 371 (c)(1),
(2) Date: Jul. 20, 2018

(87) PCT Pub. No.: WO2017/125070
PCT Pub. Date: Jul. 27, 2017

(65) Prior Publication Data
US 2019/0032819 A1    Jan. 31, 2019

(30) Foreign Application Priority Data

Jan. 20, 2016  (CN) .......................... 2016 1 0040055

(51) Int. Cl.
*F16L 9/17*      (2006.01)
*B21C 37/08*   (2006.01)
(Continued)

(52) U.S. Cl.
CPC ................ *F16L 9/17* (2013.01); *B21C 37/08* (2013.01); *B21C 37/0815* (2013.01);
(Continued)

(58) Field of Classification Search
CPC .... F16L 9/17; F16L 9/02; B21C 37/08; B21C 37/0815; B21C 37/154; B21C 1/22;
(Continued)

(56) References Cited

U.S. PATENT DOCUMENTS 4,211,042 A * 7/1980 Deverell .................. B24B 1/00
228/125
5,494,209 A   2/1996 Randlett et al.
(Continued)

FOREIGN PATENT DOCUMENTS

CN       2887514 Y    4/2007
CN     101205587 A    6/2008
(Continued)

OTHER PUBLICATIONS

International Search Report dated May 2, 2017 in connection with Application No. PCT/CN2017/071916.
(Continued)

*Primary Examiner* — Craig M Schneider
*Assistant Examiner* — David R Deal
(74) *Attorney, Agent, or Firm* — Wolf, Greenfield & Sacks, P.C.

(57) ABSTRACT

A pipe body, wherein the pipe body (10) has a welded portion (11) at both ends of the pipe body, aligned in a widthwise direction of the pipe body (10). The thickness of the welded portion (11) decreases gradually from the inside to the outside of the pipe, and an outer end of the welded portion (11) is located at a center portion of the pipe body (10) in a thickness direction. The configuration of the welding structure enhances the strength of the welded por-
(Continued)

tion of the pipe, so that the pipe will not crack easily when it is reworked by flaring or bending, thus having high reworkability. In addition, a pipe (100) made of the pipe body (10) and a method of making the pipe (100) are disclosed.

11 Claims, 7 Drawing Sheets

(51) Int. Cl.
  *B21C 37/15* (2006.01)
  *B23K 1/00* (2006.01)
  *B23K 1/16* (2006.01)
  *F16L 9/02* (2006.01)
  *B21C 1/22* (2006.01)
  *B23K 101/06* (2006.01)
  *B23K 101/10* (2006.01)
  *B23K 103/22* (2006.01)

(52) U.S. Cl.
  CPC .......... *B21C 37/154* (2013.01); *B23K 1/0008* (2013.01); *B23K 1/16* (2013.01); *F16L 9/02* (2013.01); *B21C 1/22* (2013.01); *B23K 2101/06* (2018.08); *B23K 2101/10* (2018.08); *B23K 2103/22* (2018.08)

(58) Field of Classification Search
  CPC .. B23K 1/16; B23K 2101/06; B23K 2101/10; B23K 2103/22
  USPC ........................................................ 138/171
  See application file for complete search history.

(56) References Cited

U.S. PATENT DOCUMENTS

| | | | | |
|---|---|---|---|---|
| 5,558,159 A * | 9/1996 | Kato | ..................... | F28F 9/0243 138/171 |
| 6,379,821 B2 * | 4/2002 | Kushida | ............... | B23K 9/0253 428/685 |
| 6,782,921 B1 * | 8/2004 | Tsuru | ..................... | B21C 37/08 138/142 |
| 8,039,118 B2 * | 10/2011 | Hara | ..................... | B23K 9/0282 428/683 |
| 8,084,144 B2 * | 12/2011 | Hara | ..................... | B23K 9/0253 428/683 |
| 8,925,627 B2 * | 1/2015 | Tupper | ................... | E21B 17/20 166/302 |
| 8,955,554 B2 * | 2/2015 | Ishigami | .............. | B23K 9/0253 138/171 |
| 9,000,320 B2 * | 4/2015 | Kenmochi | .......... | B21C 37/0822 219/61 |
| 2013/0037162 A1 * | 2/2013 | Shinohara | ................ | C21D 8/02 138/171 |
| 2014/0037979 A1 * | 2/2014 | Cacace | .................. | B21D 39/04 428/577 |
| 2016/0033059 A1 | 2/2016 | Fonte | | |
| 2017/0356071 A1 * | 12/2017 | Toyoda | ..................... | F16L 9/17 |

FOREIGN PATENT DOCUMENTS

| | | |
|---|---|---|
| CN | 201095025 A | 8/2008 |
| CN | 101797600 A | 8/2010 |
| CN | 203215115 U | 9/2013 |
| CN | 203273062 U | 11/2013 |
| CN | 103470873 A | 12/2013 |
| CN | 103551750 A | 2/2014 |
| CN | 103801809 A | 5/2014 |
| CN | 103978292 A | 8/2014 |
| CN | 104028959 A | 9/2014 |
| CN | 203875461 U | 10/2014 |
| CN | 104858536 A | 8/2015 |
| CN | 104858555 A | 8/2015 |
| CN | 104923928 A | 9/2015 |
| CN | 204771228 U | 11/2015 |
| CN | 204785135 U | 11/2015 |
| CN | 105149746 A | 12/2015 |
| CN | 105195872 A | 12/2015 |
| DE | 102010014287 A1 | 10/2011 |
| JP | S47-03731 B | 9/1972 |
| JP | 1972-038731 | 12/1972 |
| JP | H08-309527 A | 11/1996 |
| JP | 2004-306084 A | 11/2004 |
| JP | 2009-202167 A | 9/2009 |
| JP | 2014-018816 A | 2/2014 |
| JP | 2014-155948 A | 8/2014 |
| JP | 2014172063 A | 9/2014 |
| KR | 1997-0705452 A | 10/1997 |
| WO | WO 2015/200325 A1 | 12/2015 |

OTHER PUBLICATIONS

Office Action for Japanese Application No. 2018-537789, dated Oct. 1, 2019.
Office Action for Korean Application No. 10-2018-7021473, dated Oct. 29, 2019.
Chinese 1ˢᵗ Office Action dated Jul. 26, 2018 in connection with Application No. 201610040055.4.

* cited by examiner

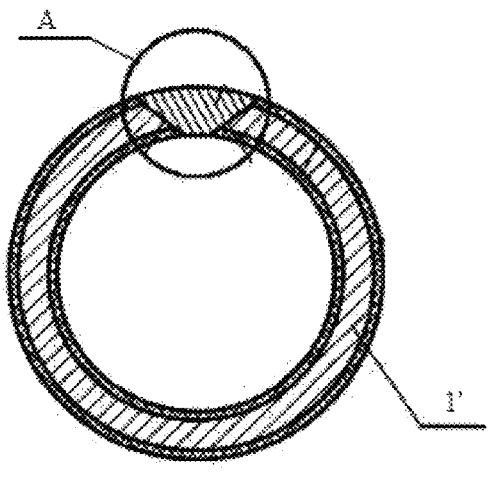
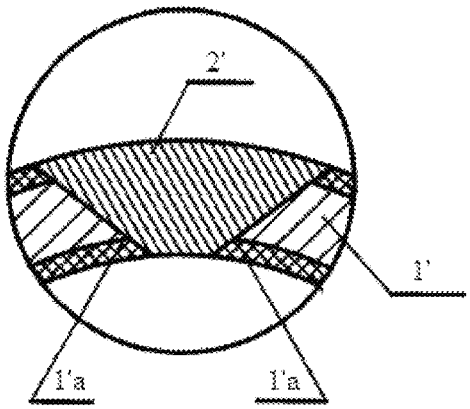
Figure 1a  Figure 1b
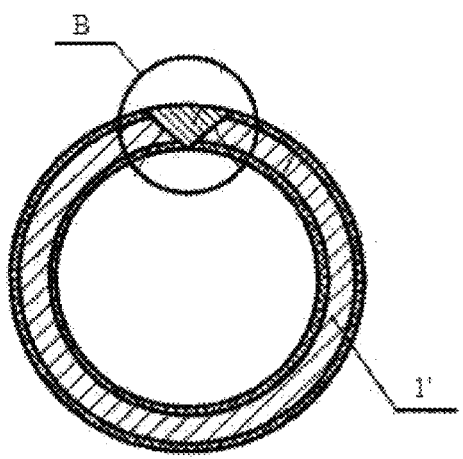
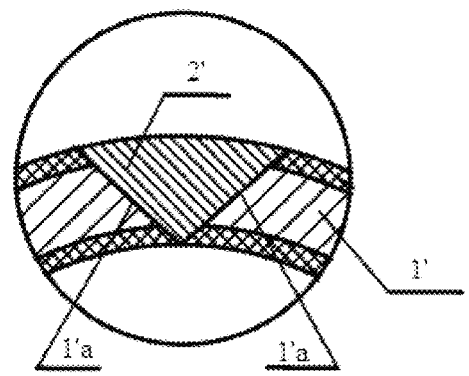
Figure 2a  Figure 2b

PIPE BODY, PIPE AND METHOD OF MAKING PIPE

This Application is a national stage filing under 35 U.S.C. 371 of International Patent Application Serial No. PCT/CN2017/071916, filed Jan. 20, 2017, which claims priority to Chinese application number 201610040055.4, filed Jan. 20, 2016. The entire contents of these applications are incorporated herein by reference in their entirety.

FIELD

The present application relates to the technical field of a refrigeration system, and particularly relates to a pipe body and a pipe made of the pipe body. The present application also relates to a manufacturing method of the pipe.

BACKGROUND

In a refrigeration system, copper materials are generally used in valves and pipe fittings for the good thermal conductivity, corrosion resistance, and processibility. However, the product costs will increase greatly if copper materials are heavily used for their high prices, which will give rise to losing competitive edge in the industry. In a case that plain carbon steel is used in substitution for copper, carbon steel is easily corroded and is not suitable for refrigeration systems where a high degree of cleanness is required.

In the conventional refrigeration system, a copper-steel composite pipe is usually used in substitution for a pipe made of a copper material.

Reference is made to FIGS. 1a and 1b, in which FIG. 1a is a schematic view showing a cross section of a pipe in the conventional technology; and FIG. 1b is a partially enlarged view showing a portion A in FIG. 1a.

As shown in the figures, a pipe body is bent and welded to form a pipe 1', weld faces 1a' at two ends of the pipe body are both inclined. A certain distance is provided between the two weld faces 1'a when the pipe body is bent. Thus, when the pipe body is welded, a weld seam 2' of the pipe 1' is in a fan shape as shown in FIG. 1b.

In addition, there is also a pipe 1' as shown in FIGS. 2a and 2b, weld faces 1a' at two ends of the pipe body are also inclined. The two weld faces 1'a are connected to each other at one end when the pipe body is welded. Thus, when the pipe body is welded, a weld seam 2' of the pipe 1' is in an inverted triangle shape as shown in FIG. 2b.

It has been found in the use of the above conventional pipe that, composite pipes having the above structures are easy to crack, especially at the weld seams. The weld seams are easily cracked during reprocessing such as flaring, bending and the like, thus the reprocessability of the pipes is poor, therefore hardly satisfying the demands of the refrigeration system which is diverse, complex, and requires pressure bearing capacity.

In addition to the copper-steel composite pipe, other composite pipes and pipe fittings made of a single material in the refrigeration system have similar problems.

In view of this, a technical issue to be addressed by those skilled in the art is how to improve the structure of the conventional pipe to enhance the strength at a welded portion, and to improve the degree of reprocessability of the pipe.

SUMMARY

An object of the present application is to provide a pipe body and a pipe made of the pipe body. The strength at a welded portion of the pipe made of the pipe body is enhanced, and the welded portion is not easily cracked during reprocessing such as flaring, bending and the like, thereby having a high degree of reprocessability. Another object of the present application is to provide a manufacturing method of a pipe.

In order to solve the above technical problem, a pipe body is provided according to the present application, wherein two ends of the pipe body are both provided with a welded portion, a thickness of the welded portion decreases gradually from the inside to the outside of the pipe body in a direction along the width of the pipe body, and an outer end of the welded portion is located at a center portion in a direction along the thickness of the pipe body.

As mentioned above, according to the pipe body in the present application, the thickness of the welded portion decreases gradually from the inside to the outside of the pipe body in a direction along the width of the pipe body, and the outer end of the welded portion is located at the center portion of the pipe body. In this way, the pipe body is bent and welded at two welded portions of the pipe body to form the pipe, with a welded part in a X shape. Compared with a conventional fan-shaped welded part and a conventional inverted triangle welded part, an area of a joint surface of the welded part increases greatly. Furthermore, since the outer end of the welded portion is located at the center portion in a direction along the thickness of the pipe body, a base metal of this part plays a supporting role in the entire welded portion when the pipe body is welded, thereby greatly improving the tensile strength at the welded part. In addition, the welded part in an X shape makes the base metal and solder substantially symmetrical with respect to a center of a wall thickness of the pipe, which can change a direction of force, and can relieve a direction of deformation and an effect of stress to a certain extent. So the pipe is not easy to crack from an inner wall when subjected to a large transverse tension. Therefore, the pipe made of this pipe body has a high degree of reprocessability.

A peripheral face of the welded portion is formed by two or more straight-line segments and/or arc segments connected in sequence.

The peripheral face of the welded portion includes three straight-line segments in sequence: a first straight-line segment, a second straight-line segment and a third straight-line segment, wherein the second straight-line segment forms a face of an outer end of the welded portion.

The second straight-line segment is parallel to a direction along the thickness of the pipe body, and a length of the second straight-line segment is 0.1 to 0.5 times the thickness of the pipe body. A length of the first straight-line segment and a length of the third straight-line segment are both 1 to 3 times the thickness of the pipe body.

An included angle between the first straight-line segment and the direction along the thickness of the pipe body, and an included angle between the second straight-line segment and the direction along the thickness of the pipe body are both in a range of 20° to 80°.

The peripheral face of the welded portion includes two arc segments: a first arc segment and a second arc segment, wherein a connecting part between the first arc segment and the second arc segment forms the face of the outer end of the welded portion.

The peripheral face of the welded portion further includes a transitional arc segment, and the first arc segment and the second arc segment are connected by the transitional arc segment.

A radius of the first arc segment and a radius of the second arc segment are both 0.5 to 8 times the thickness of the pipe body.

The peripheral face of the welded portion is symmetrical with respect to a center in the direction along the thickness of the pipe body.

The peripheral face of the welded portion is in a semi-oval shape.

A long radius of a semi-oval shape is 0.25 to 3 times the thickness of the pipe body, and a short radius of the semi-oval shape is 0.25 to 0.75 times the thickness of the pipe body.

A pipe is further provided according to the present application the pipe body is bent and welded to form the pipe, and the pipe body is the pipe body according to any one of above solutions, and a weld seam of the pipe is in an X shape.

Since the pipe body has above technical effects, the pipe made of the pipe body also has the above technical effects, which is not further described herein.

The pipe is specifically a composite pipe, the pipe body includes a first layer body and a second layer body fixed at an inner side and/or an outer side of the first layer body, and materials of the first layer body and the second layer body are different.

The first layer body is a steel material, and the second layer body is a copper material.

A manufacturing method of a pipe is further provided according to the present application, and the method includes following steps:

a. manufacturing a pipe body;

b. manufacturing a welded portion at each of two ends of the pipe body, wherein the thickness of the welded portion decreases gradually from the inside to the outside of the pipe body in a direction along the width of the pipe body, and the outer end of the welded portion is located at a center portion in a direction along the thickness of the pipe body;

c. extruding the pipe body with the welded portion into a circular pipe shape, and maintaining a predetermined distance between faces of ends of two welded portions of the pipe body;

d. welding the two welded portions to form the pipe.

The manufacturing method of a pipe further includes following steps after step d:

e. accurately correcting the pipe formed in step d;

f. performing an eddy current testing on the pipe after accurate correction in step e, and performing a secondary annealing treatment for a predetermined time on the pipe.

In step f, the pipe after accurate correction is fed into a vacuum furnace with a preset temperature for the secondary annealing treatment.

In step a, a first layer body and a second layer body of different materials are prepared, the second layer body is fixed at an inner side and/or an outer side of the first layer body, and the first layer body and the second layer body are rolled into one body by a method of rolling, to form the pipe body.

In step c, the predetermined distance is 1 to 3 times the thickness of the pipe body.

BRIEF DESCRIPTION OF THE DRAWINGS

FIG. 1a is a schematic view showing a cross section of a pipe in the conventional technology;

FIG. 1b is a partially enlarged view showing a portion A in FIG. 1a;

FIG. 2a is a schematic view showing a cross section of another pipe in the conventional technology;

FIG. 2b is a partially enlarged view showing a portion B in FIG. 2a;

Figure 3:
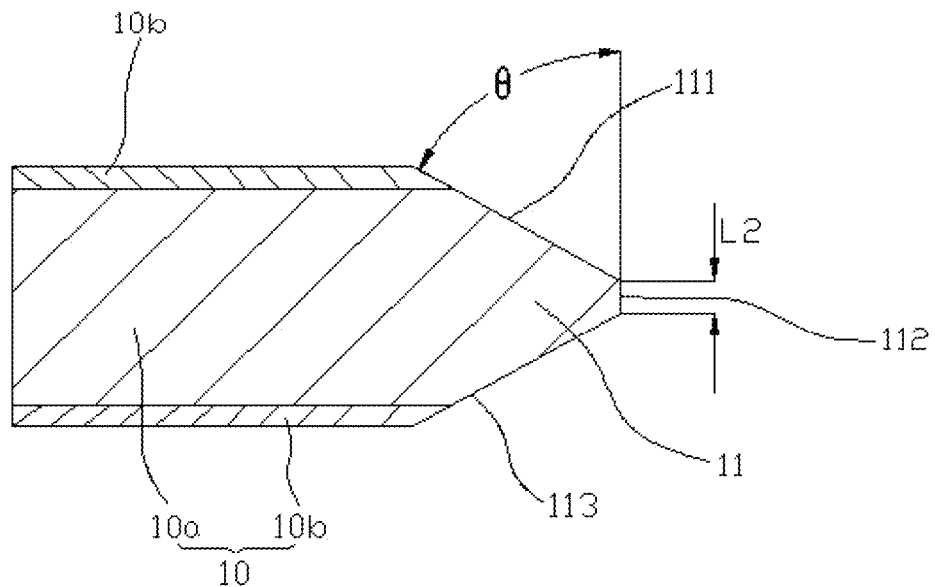
FIG. 3 is a schematic view showing the structure of a welded portion of a pipe body according to a first embodiment of the present application.

Corresponding relationships between reference numerals and components in FIGS. 1a to 2b are as follows:

| 1' | pipe, | 1'a | weld face, |
|---|---|---|---|
| 2' | weld seam; | | |

Corresponding relationships between reference numerals and components in FIGS. 3 to 14 are as follows:

| 100 | pipe, | 10 | pipe body, |
|---|---|---|---|
| 10a | first layer body, | 10b | second layer body, |
| 11 | welded portion, | 20 | weld seam, |
| 111 | first straight-line segment, | 112 | second straight-line segment, |
| 113 | third straight-line segment, | 114 | first arc segment, |
| 115 | second arc segment, | 116 | transitional arc segment. |

DETAIL DESCRIPTION

By bending and welding a pipe body, a conventional pipe is formed. It has been found by research that, a welded part of the pipe is in a fan-shape or an inverted triangle shape, therefore, a wall thickness of the pipe gradually decreases from an inner wall to an outer wall of the pipe at the welded part, and thus solder gradually increases. The combination of the pipe mainly depends on the solder. The strength of the solder is usually less than the strength of a material of the pipe, so during reprocessing such as flaring, bending and the like, forces and deformation of the inner wall are inconsistent with that of the outer wall. Therefore, a crack easily emerges from the inner wall, and rapidly extends to the outer wall along a line of a joint surface, and the pipe bursts and become unusable. In view of this, a solution is provided according to the present application, which is illustrated in detail hereinafter.

In order to facilitate understanding and simplify the description, the pipe and the pipe body will be illustrated together hereinafter, and the beneficial effects will not be described in detail.

A pipe according to the present application is mainly formed by welding and bending a pipe body, wherein a length of the pipe body is a length of the formed pipe, a width of the pipe body is substantially a circumferential size of the formed pipe, and a thickness of the pipe body is a wall thickness of the formed pipe. That is, when the pipe body is bent in a direction along the width thereof, two end portions in the width direction are welded to form the pipe. The length, width and thickness of the pipe body are taken as reference for related position herein.

The pipe body according to the present application are provided with a welded portion at both two ends thereof. A thickness of the welded portion decreases gradually from the inside to the outside of the pipe body in a direction along the width of the pipe body, and an outer end of the welded portion is located at a center portion in a direction along the thickness of the pipe body.

It should be noted that, the "center portion" herein refers to a center point and a region near the center point in a direction along the thickness of the pipe body.

By employing the above structure, in the pipe formed by welding and bending the pipe body, a welded part thereof is substantially in a X-shape. Compared with a conventional fan-shaped welded part or a conventional inverted triangle welded part, an area of a joint surface of the welded part increases greatly. Furthermore, since the outer end of the welded portion is located at the center portion in a direction along the thickness of the pipe body, a base metal of this part plays a supporting role in the entire welded portion when the pipe body is welded, thereby greatly improving the tensile strength of the welded part. In addition, the welded part in an X shape makes the base metal and solder substantially symmetrical with respect to a center of a wall thickness of the pipe, which can improve a direction of force, and can relieve a direction of deformation and a an effect of stress to a certain extent. So the pipe is not easy to crack from an inner wall when subjected to a large transverse tension. Therefore, the pipe made of this pipe body has a high degree of reprocessability.

The pipe body according to the present application has multiple specific structures, and the present application is further illustrated in detail hereinafter in conjunction with the drawings and specific embodiments.

Figure 4:
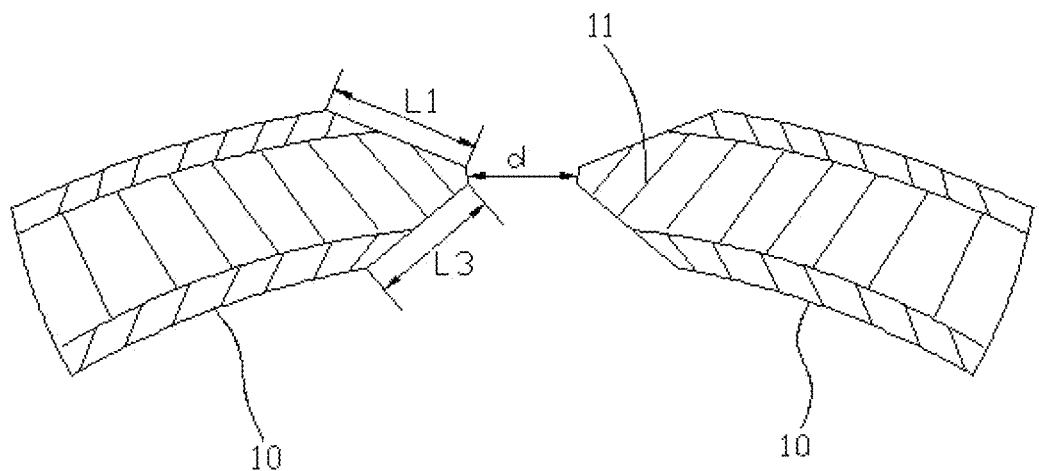
FIG. 4 is a schematic view showing a welded structure of a pipe employing the welded portion in FIG. 3.
Figure 5:
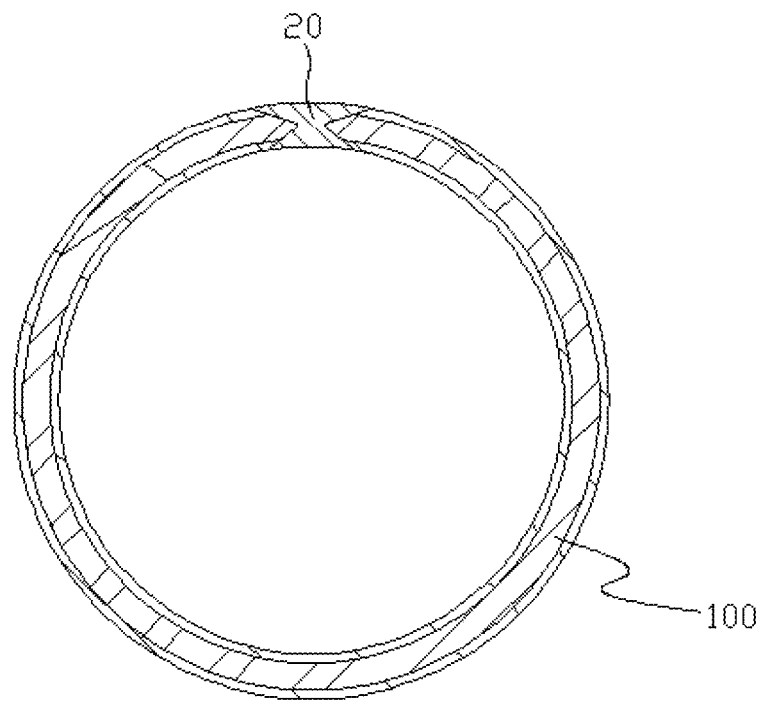
FIG. 5 is a schematic view showing a cross section of a pipe according to the first embodiment of the present application.

Reference is made to FIGS. 3 to 5, in which FIG. 3 is a schematic view showing the structure of a welded portion of a pipe body according to a first embodiment of the present application, FIG. 4 is a schematic view showing a welded structure of a pipe employing the welded portion in FIG. 3, and FIG. 5 is a schematic view showing a cross section of a pipe according to the first embodiment of the present application.

In this embodiment, a peripheral face of the welded portion 11 of the pipe body 10 includes three straight-line segments in sequence: a first straight-line segment 111, a second straight-line segment 112 and a third straight-line segment 113, wherein the second straight-line segment 112 forms a face of an outer end of the welded portion 11.

In this specific solution, the second straight-line segment 112 is parallel to a direction along the thickness of the pipe body 10, and a center of the second straight-line segment 112 coincides with a center in a direction along the thickness of the pipe body 10; the first straight-line segment 111 and the third straight-line segment 113 are symmetrical with respect to the second straight-line segment 112, that is, a length L1 of the first straight-line segment 111 is equal to a length L3 of the third straight-line segment 113.

In this way, a weld seam 20 of a pipe 100 being formed is completely symmetrical in a radial direction and a circumferential direction, as shown in FIG. 5, thereby improving the uniformity of stress at the welded part. It can also be seen from FIG. 5 that, an outer end of the welded portion 11 is located at a center portion of the weld seam 20, and the welded part can play a supporting role, so that the tensile strength at the welded part can be enhanced.

Specifically, a length L2 of the second straight-line segment 112 can be set to be 0.1 to 0.5 times a thickness of the pipe body 10; and the length L1 of the first straight-line segment 111 and the length L3 of the third straight-line segment 113 can be set to be 1 to 3 times the thickness of the pipe body 10.

In actual application, the specific length of each of the straight-line segments can be chosen according to a pipe material and application requirements.

An included angle θ (shown in FIG. 3) between the first straight-line segment 111 and the direction along the thickness of the pipe body 10 and an included angle (not shown in the figure) between the third straight-line segment 113 and the direction along the thickness of the pipe body 10 can both be chosen in a range from 20° to 80° according to the pipe material and the application requirements.

A predetermined distance d is provided between faces of outer ends of two welded portions 11 when the pipe body 10 is bent, and the predetermined distance d is generally 1 to 3 times the thickness of the pipe body 10. This arrangement helps to ensure the fluidity of the solder during welding, to fuse the solder and the base metal well, and to enhance the strength of the weld seam 20.

It should be understood that, it is also feasible to connect faces of the outer ends of two welded portions 11 together.

Figure 6:
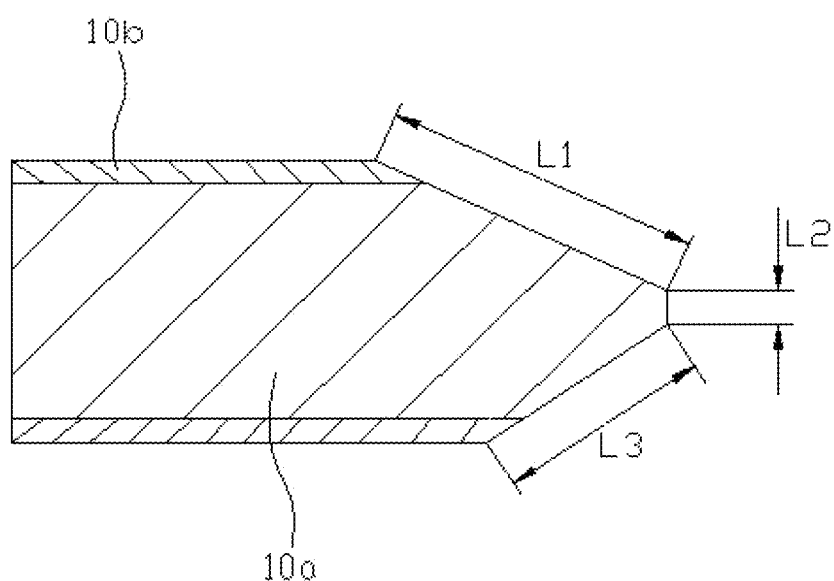
FIG. 6 is a schematic view showing the structure of a welded portion of a pipe body according to a second embodiment of the present application.
Figure 7:
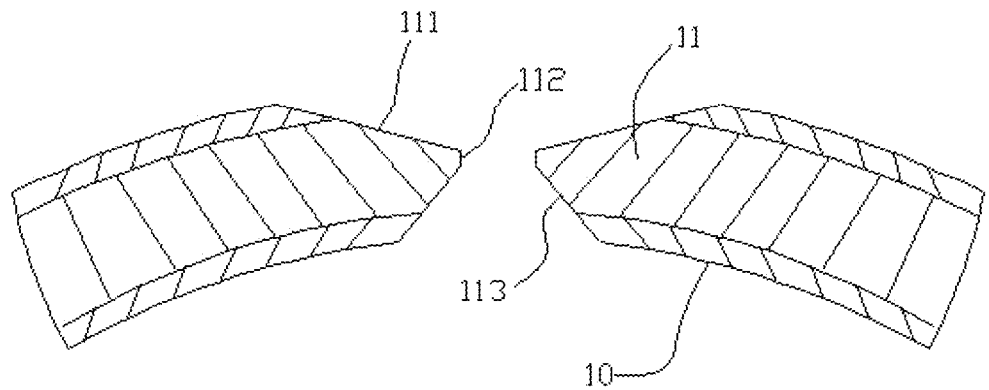
FIG. 7 is a schematic view showing a welded structure of a pipe employing the welded portion in FIG. 6.

Reference is made to FIGS. 6 and 7, in which FIG. 6 is a schematic view showing the stricture of a welded portion of a pipe body according to a second embodiment of the present application, and FIG. 7 is a schematic view showing a welded structure of a pipe employing the welded portion in FIG. 6.

The basic structure of the welded portion in this embodiment is consistent with that in the above first embodiment, while a difference lies in that, in this embodiment, the length L1 of the first straight-line segment 111 of the welded portion 11 is greater than the length L3 of the third straight-line segment 113. The welded part of the pipe 100 is shown in FIG. 7.

Figure 8:
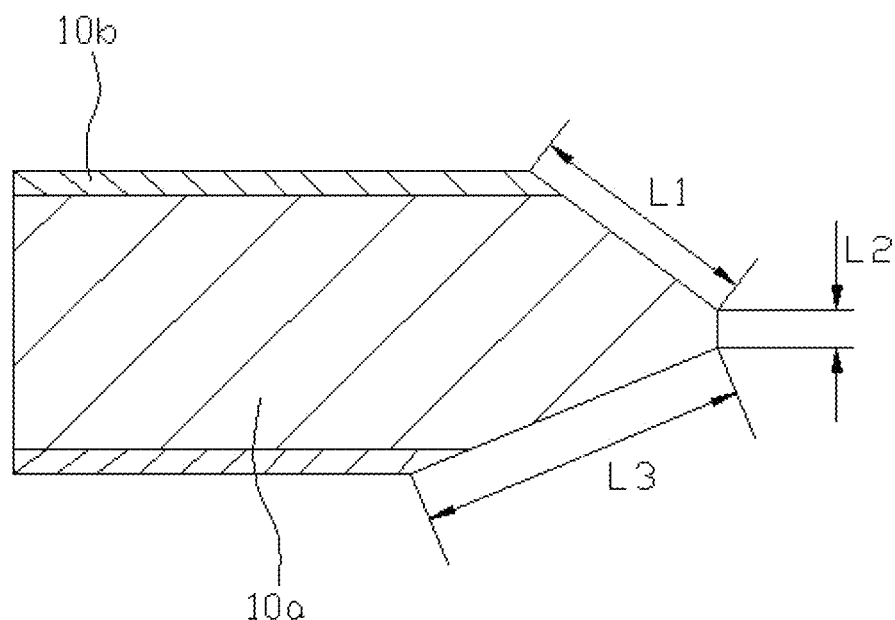
FIG. 8 is a schematic view showing the structure of a welded portion of a pipe body according to a third embodiment of the present application.
Figure 9:
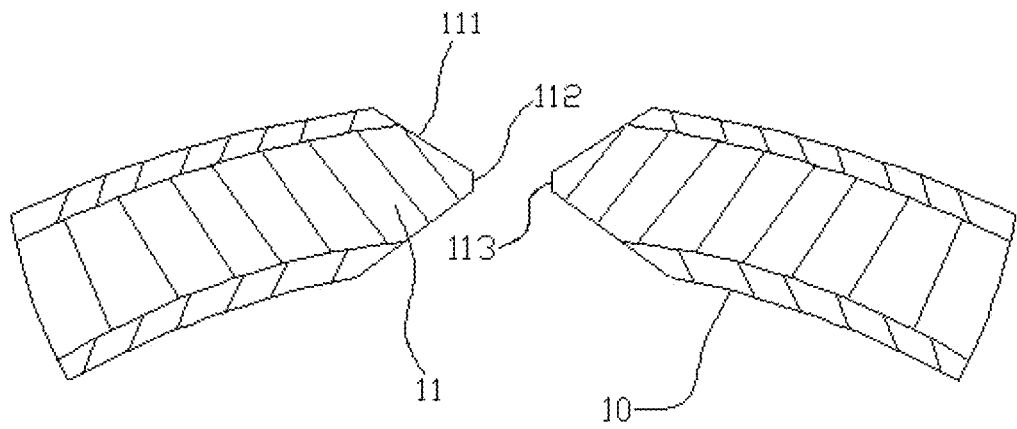
FIG. 9 is a schematic view showing a welded structure of a pipe employing the welded portion in FIG. 8.

Reference is made to FIGS. 8 and 9, in which FIG. 8 is a schematic view showing the structure of a welded portion of a pipe body according to a third embodiment of the present application, and FIG. 9 is a schematic view showing a welded structure of a pipe employing the welded portion in FIG. 8.

The basic structure of the welded portion in this embodiment is also consistent with that in the above first embodiment, while the difference lies in that, in this embodiment, the length L1 of the first straight-line segment 111 of the welded portion 11 is smaller than the length L3 of the third straight-line segment 113. The welded part of the pipe is shown in FIG. 9.

In the second embodiment and the third embodiment, ranges of relevant parameters of each of the straight-line segments are consistent with that in the first embodiment, which will not be described in detail.

It should be noted that, in the above three embodiments, the peripheral faces of the welded portions 11 are all formed by three straight-line segments. However, it should be understood that, the peripheral faces of the welded portion 11 can also be formed by two straight-line segments actually, that is, the second straight-line segment is omitted. In this way, a connecting part between the first straight-line segment and the third straight-line segment forms a tip, which is comparatively not beneficial to the flowing of the solder during a welding process. Therefore, the above three embodiments can be used as preferred solutions. In addition, the peripheral face of the welded portion 11 may also be formed by more straight-line segments, which will not be described one by one.

Figure 10:
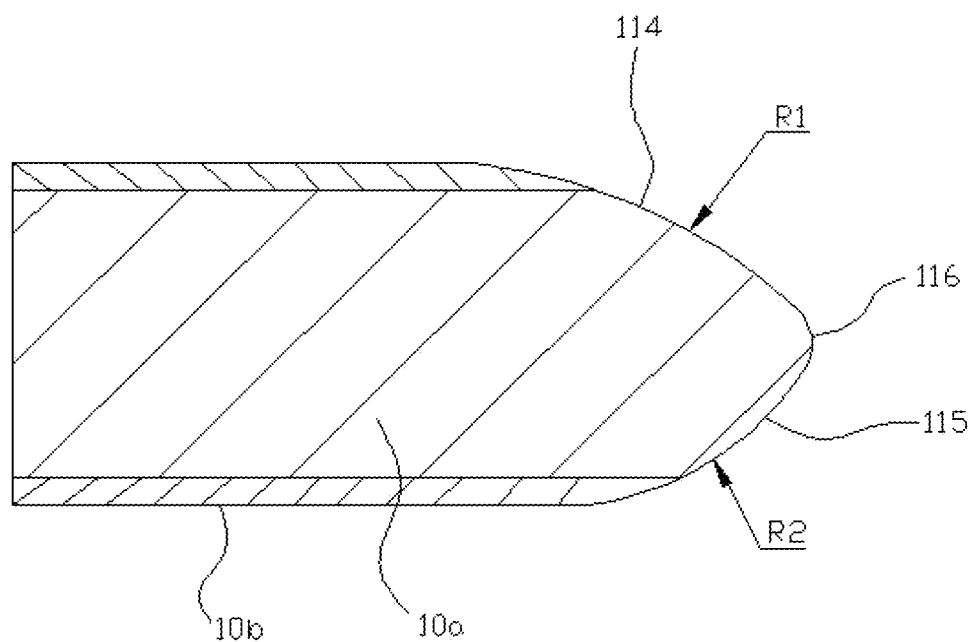
FIG. 10 is a schematic view showing the structure of a welded portion of a pipe body according to a fourth embodiment of the present application.
Figure 11:
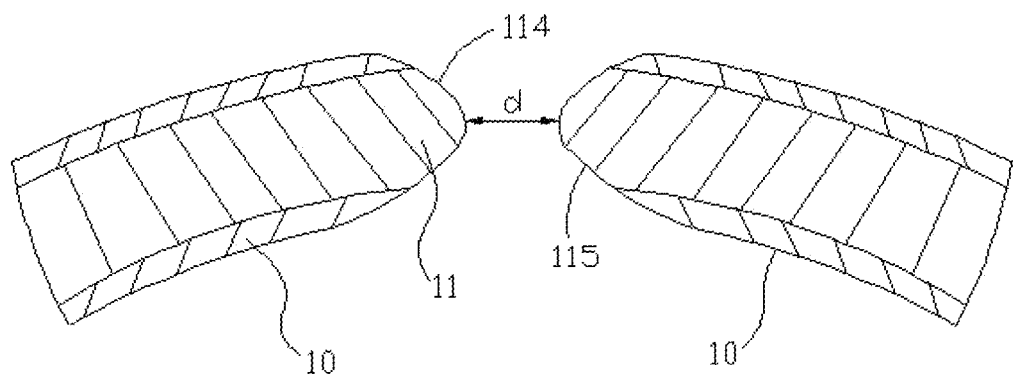
FIG. 11 is a schematic view showing a welded structure of a pipe employing the welded portion in FIG. 10.

Reference is made to FIGS. 10 and 11, in which FIG. 10 is a schematic view showing the structure of a welded portion of a pipe body according to a fourth embodiment of the present application, and FIG. 11 is a schematic view showing a welded structure of a pipe employing the welded portion in FIG. 10.

In this embodiment, the peripheral face of the welded portion 11 of the pipe body 10 includes a first arc segment 114 and a second arc segment 115, wherein a connecting part between the first arc segment 114 and the second arc segment 115 forms the face of the outer end of the welded portion 11.

Further, the first arc segment 114 and the second arc segment 115 are connected by a transitional arc segment 116, to ensure a smooth transition at the connecting part between the first arc segment 114 and the second arc segment 115, thus helps the solder to wet the base metal and flow during the welding process.

In the specific solution, a radius of the first arc segment 114 and a radius of the second arc segment 115 are both 0.5 to 8 times the thickness of the pipe body 10.

In the specific solution, the radius R1 of the first arc segment 114 is larger than the radius R2 of the second arc segment 115.

Similarly, in this solution, a predetermined distance d is also provided between the faces of outer end of the two welded portions 11 when the pipe body 10 is bent, and the predetermined distance d is 1 to 3 times the thickness of the pipe body 10, to improve the fluidity of the solder during the welding process.

Figure 12:
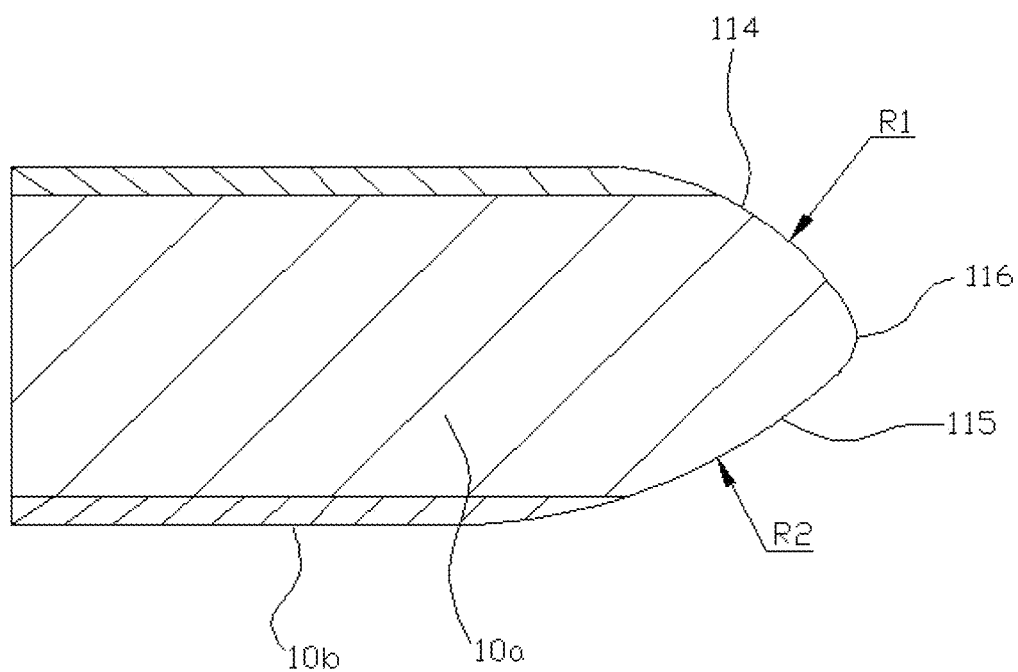
FIG. 12 is a schematic view showing the structure of a welded portion of a pipe body according to a fifth embodiment of the present application.
Figure 13:
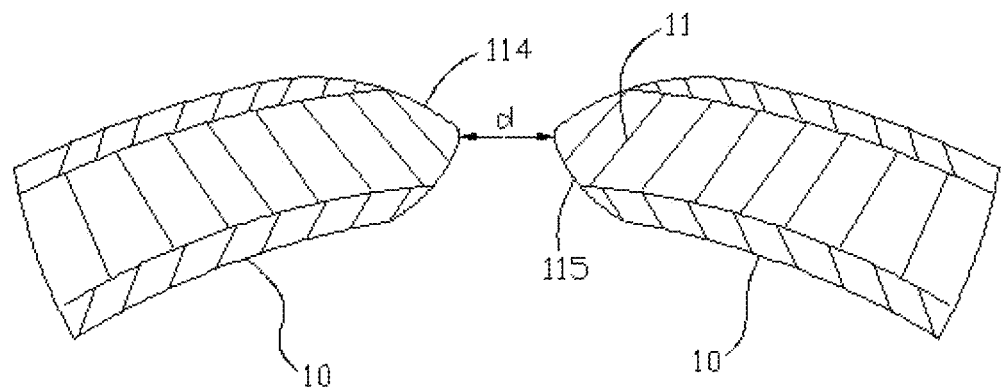
FIG. 13 is a schematic view showing a welded structure of a pipe employing the welded portion in FIG. 12.

Reference is made to FIGS. 12 and 13, in which FIG. 12 is a schematic view showing the structure of a welded portion of a pipe body according to a fifth embodiment of the present application, and FIG. 13 is a schematic view showing a welded structure of a pipe employing the welded portion in FIG. 12.

The basic structure of the wielded portion in this embodiment is consistent with that in the above fourth embodiment, and the difference lies in that, in this embodiment, the radius R1 of the first arc segment 114 is smaller than the radius R2 of the second arc segment 115.

The ranges of the relevant parameters of each of the arc segments can be consistent with that in the fourth embodiment, which will not be described in detail.

It should be understood that, in the specific arrangement, the radius R1 of the first arc segment 114 may be equal to the radius R2 of the second arc segment 115, and a center of the connecting part between the first arc segment 114 and the second arc segment 115 is located at the center in a direction along the thickness of the pipe body 10. In this way, the welded structure is completely symmetrical, and the stress at the welded part is more uniform when the pipe is formed.

It should be noted that, in the actual arrangement, the peripheral face of the welded portion 11 can also be formed by two or more straight-line segments and arc segments connecting together besides the above manner that the peripheral face of the welded portion 11 is formed by several straight-line segments or several arc segments.

Figure 14:
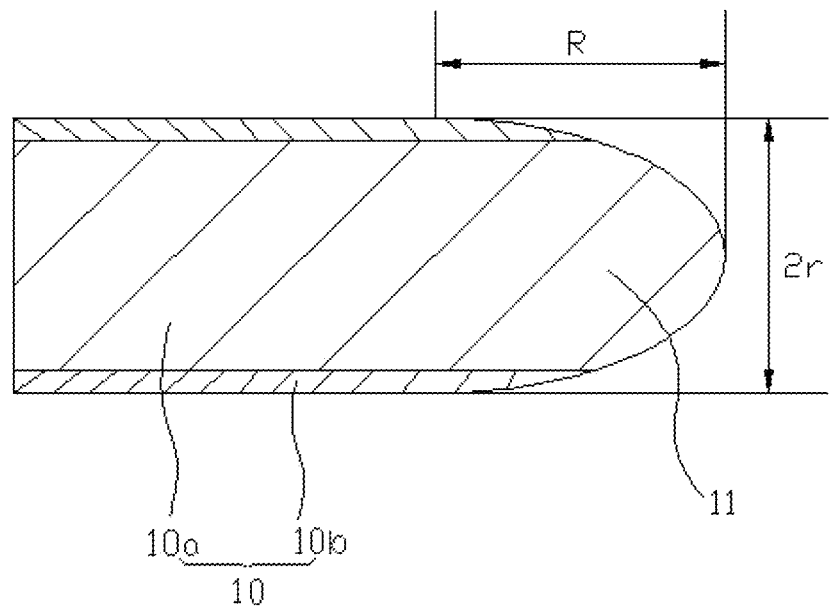
FIG. 14 is a schematic view showing the structure of a welded portion of a pipe body according to a sixth embodiment of the present application.

Reference is made to FIG. 14, which is a schematic view showing the structure of a welded portion of a pipe body according to a sixth embodiment of the present application.

In this embodiment, the peripheral face of the welded portion 11 is in a semi-oval shape, to facilitate manufacture.

Specifically, a long radius R of the semi-oval shaped structure is 0.25 to 3 times the thickness of the pipe body 10, and a short radius r of the semi-oval shaped structure is 0.25 to 0.75 times the thickness of the pipe body 10.

As shown in FIG. 14, in this specific embodiment, a long axis of the semi-oval shaped structure is in a direction along the width of the pipe body 10, and a short axis of the semi-oval shaped structure is in a direction along the thickness of the pipe body 10. It could be understood that, the long axis and the short axis can be reversed in the actual arrangement, that is, the long axis is in a direction along the thickness of the pipe body 10, and the short axis is in a direction along the width of the pipe body 10.

Six specific forms of the pipe body are illustrated hereinbefore, it could be understood that, various changes in the specific form of the pipe body can be made based on the above principles, which will not be enumerated herein.

In actual applications, a material of the pipe body 10 may be a single material, and may also be a composite material.

Taking FIG. 3 as an example, in the specific solution, the pipe body 10 includes a first layer body 10a and a second layer body 10b fixed at an inner side and an outer side of the first layer body 10a, and materials of the first layer body 10a and the second layer body 10b are different.

More specifically, the first layer body 10a is a steel material, which specifically can be low-carbon steel; and the second layer body 10b is a copper material.

It could be understood that, in the actual arrangement, it is also feasible that the second layer body 10b is arranged only at the inner side or the outer side of the first layer body 10a.

In addition to the above pipe and the pipe body, a manufacturing method of a pipe is further provided according to the present application, and the manufacturing method specifically includes following steps:

a. manufacturing a pipe body, wherein a size of the corresponding pipe body is prepared according to a size of a prefabricated pipe, a first layer body and a second layer body of different materials are prepared in a case that the prefabricated pipe is a composite pipe of two materials, the second layer body is fixed at the inner side and/or outer side of the first layer body, the first layer body and the second layer body are rolled into an integral body by the method of rolling, an annealing treatment is performed after the first layer body and the second layer body are flattened, to accelerate molecular movements of the two materials in a high temperature environment and to promote the formation of a molecular bonding layer, and the pipe body is formed;

b. manufacturing a welded portion at each of two ends of the pipe body, wherein the structure of the welded portion is as described in the above embodiments, which will not be further described, and relevant sizes of the welded portion are designed according to the performance that the prefabricated pipe requires;

c. extruding the pipe body in step b into a circular pipe shape, and maintaining a predetermined distance between faces of ends of the two welded portions of the pipe body, wherein in this step, the pipe body can be fed into a forming machine to be bent and extruded into the circular pipe shape;

d. welding the two welded portions to form a pipe, wherein in this step, a low-stress welding manner can be specifically used, to fuse the solder and the base metal and to form a weld seam, and an excessive part of the weld seam can be removed by machining, to ensure a smooth transition between the weld seam and the base metal.

Further, the manufacturing method of the pipe also includes following steps after step d:

e. accurately correcting the pipe formed in step d, wherein a mould with a certain inner diameter is used to correct the pipe, to ensure the accuracy and roundness;

f. performing eddy current testing on the pipe after accurate correction in step e, and performing a secondary annealing treatment for a predetermined time on the pipe, wherein the eddy current testing is performed by an eddy current testing instrument, to ensure the high accuracy requirement of the pipe, and the secondary annealing treatment for a predetermined time is performed, to improve a elongation rate and processability of the pipe can greatly, thereby meeting the diverse requirements of the refrigeration system, and specifically, the pipe can be fed into a vacuum furnace of 800 to 1000° C. for the secondary annealing treatment.

Taking a copper-steel composite pipe as an example, it is shown by a test that after the secondary annealing treatment, a flaring rate of the copper-steel composite pipe is above 20.7%, the elongation rate is over 30%, and the pressure resistance is significantly improved.

The pipe body, the pipe and the manufacturing method of a pipe according to the present application are described in detail hereinbefore. The principle and the embodiments of the present application are illustrated herein by specific examples. The above description of examples is only intended to help the understanding of the method and the spirit of the present application. It should be noted that, for those skilled in the art, a few of modifications and improvements may be made to the present application without departing from the principle of the present application, and these modifications and improvements are also deemed to fall into the scope of the present application defined by the claims.

What is claimed is:

1. A pipe, wherein the pipe is formed by welding and bending a pipe body, a weld seam of the pipe is in an X-shape, wherein two ends of the pipe body are both provided with a welded portion, a thickness of the welded portion decreases gradually from an inside to an outside of the pipe body in a direction along a width of the pipe body, and an outer end of the welded portion is located at a center portion in a direction along a thickness of the pipe body, wherein a peripheral face of the welded portion is formed by two or more straight-line segments connected in sequence, wherein a predetermined distance is provided between faces of outer ends of two welded portions when the pipe body is bent, and the predetermined distance is 1 to 3 times the thickness of the pipe body.

2. The pipe according to claim 1, wherein the peripheral face of the welded portion comprises three straight-line segments in sequence: a first straight-line segment, a second straight-line segment and a third straight-line segment, and the second straight-line segment forms a face of an outer end of the welded portion.

3. The pipe according to claim 2, wherein the second straight-line segment is parallel to a direction along the thickness of the pipe body, and a length of the second straight-line segment is 0.1 to 0.5 times the thickness of the pipe body; a length of the first straight-line segment and a length of the third straight-line segment are both 1 to 3 times the thickness of the pipe body.

4. The pipe according to claim 3, wherein an included angle between the first straight-line segment and the direction along the thickness of the pipe body and an included angle between the second straight-line segment and the direction along the thickness of the pipe body are both in a range of 20° to 80°.

5. The pipe according to claim 1, wherein the peripheral face of the welded portion is symmetrical with respect to a center in the direction along the thickness of the pipe body.

6. The pipe according to claim 1, wherein the pipe is specifically a composite pipe, the pipe body comprises a first layer body and a second layer body fixed at an inner side and/or an outer side of the first layer body, and materials of the first layer body and the second layer body are different.

7. The pipe according to claim 6, wherein the first layer body is a steel material, and the second layer body is a copper material.

8. A manufacturing method of a pipe, comprising following steps: a. manufacturing a pipe body; b. manufacturing a welded portion at each of two ends of the pipe body, wherein a thickness of the welded portion decreases gradually from an inside to an outside of the pipe body in a direction along a width of the pipe body, and an outer end of the welded portion is located at a center portion in a direction along a thickness of the pipe body, wherein a peripheral face of the welded portion is formed by two or more straight-line segments connected in sequence creating a weld seam of the pipe in an X-shape; c. extruding the pipe body in step b into a circular pipe shape, and maintaining a predetermined distance between faces of ends of two welded portions of the pipe body, and the predetermined distance is 1 to 3 times the thickness of the pipe body; d. welding the welded portion at each of two ends of the pipe body to form the pipe.

9. The manufacturing method of the pipe according to claim 8, further comprising following steps after step d:
    e. accurately correcting the pipe formed in step d;
    f. performing an eddy current testing on the pipe after accurate correction in step e, and performing a secondary annealing treatment for a predetermined time on the pipe.

10. The manufacturing method of a pipe according to claim 9, wherein in step f, the pipe after accurate correction is fed into a vacuum furnace with a preset temperature for the secondary annealing treatment.

11. The manufacturing method of a pipe according to claim 8, wherein in step a, a first layer body and a second layer body of different materials are prepared, the second layer body is fixed at an inner side and/or an outer side of the first layer body, and the first layer body and the second layer body are rolled into an integral body by a method of rolling, to form the pipe body.

\* \* \* \* \*